(12) United States Patent
Monsorno et al.

(10) Patent No.: US 12,203,555 B2
(45) Date of Patent: Jan. 21, 2025

(54) INJECTION MOLDED PLASTIC VALVE ASSEMBLY FOR A MOTOR VEHICLE

(71) Applicant: Röchling Automotive SE, Mannheim (DE)

(72) Inventors: Davide Monsorno, Trento (IT); Fabrizio Chini, Isera (IT); Ion Constantin, Oarja Județul Argeș (RO); Alberto Migliorini, Caselette (IT); Ivan De Metri, Bolzano (IT)

(73) Assignee: Röchling Automotive SE, Mannheim (DE)

( * ) Notice: Subject to any disclaimer, the term of this patent is extended or adjusted under 35 U.S.C. 154(b) by 0 days.

(21) Appl. No.: 17/545,738

(22) Filed: Dec. 8, 2021

(65) Prior Publication Data

US 2022/0186847 A1 Jun. 16, 2022

(30) Foreign Application Priority Data

Dec. 10, 2020 (DE) ...................... 10 2020 133 047.2

(51) Int. Cl.
*F16K 11/083* (2006.01)
*F16K 27/06* (2006.01)

(52) U.S. Cl.
CPC ........ *F16K 11/0836* (2013.01); *F16K 27/062* (2013.01)

(58) Field of Classification Search
CPC ...... F16K 5/162; F16K 5/0478; F16K 5/0264; F16K 5/166; F16K 5/0636; F16K 5/202;
(Continued)

(56) References Cited

U.S. PATENT DOCUMENTS 2,018,223 A * 10/1935 Otto ................. C10B 29/02
165/DIG. 21
2,127,679 A * 8/1938 Dudley .............. F15B 13/04
137/625.23
(Continued)

FOREIGN PATENT DOCUMENTS

AT 404172 B 9/1998
CN 209876029 U 12/2019
(Continued)

OTHER PUBLICATIONS

German Search Report for corresponding DE 10 2020 133 047.2 dated Aug. 26, 2021, 10 pgs.
(Continued)

*Primary Examiner* — Craig J Price
(74) *Attorney, Agent, or Firm* — RANKIN, HILL & CLARK LLP

(57) ABSTRACT

A valve assembly for controlling cooling fluid in a vehicle including:
  a valve housing having a housing body and a cover connected to the housing body, a valve body receiving space in the valve housing, which is enclosed by the housing body and the cover,
  a fluid line system having fluid lines, which run in different spatial regions starting from the valve body receiving space,
  a valve body accommodated in the valve body receiving space rotatable about an axis, the valve body tapering along the axis such that by rotating the valve body about the axis, a fluid connection situation of at least two fluid lines of the fluid line system is changeable, and
  a prestressing means, which applies a pressure onto the valve body along the axis in the tapering direction, (Continued)

the valve body and the housing body formed as injection molded parts from thermoplastic.

15 Claims, 6 Drawing Sheets

(58) Field of Classification Search
CPC .... F16K 5/0207; F16K 5/0271; F16K 5/0407; F16K 5/222; F16K 5/225; F16K 11/08–0836; F16K 31/60; F16K 25/00; F16K 27/062; F16K 27/0254; F16K 27/06; F16K 5/204; F16K 5/167; Y10T 137/87129; Y10T 137/87032; Y10T 137/876; Y10T 137/87909; Y10T 137/4636; Y10T 137/5689; Y10T 137/6031; Y10T 137/6035; Y10T 137/614; Y10T 137/6253; Y10T 137/7481; Y10T 137/87386; Y10T 137/87442; Y10T 137/87523; Y10T 137/88102; Y10T 137/86533; Y10T 137/865566; Y10T 137/86638; Y10T 137/86743; Y10T 137/86823; Y10T 137/86863; F01P 2007/146; F01P 1/165
USPC ............ 137/601.05, 601.16, 630.21, 625.46, 137/625.47, 375; 251/368, 309–312, 251/315.1–315.16, 314–317.01, 335, 214; 604/32; 123/41.1, 41.08, 41.02; 264/242, 264, 275, 279
See application file for complete search history.

(56) References Cited

U.S. PATENT DOCUMENTS

| | | | | |
|---|---|---|---|---|
| 2,278,246 A * | 3/1942 | Cordova | ............ | F16K 11/0836 137/625.11 |
| 2,713,987 A * | 7/1955 | Schenck | ............... | F16K 5/0271 251/188 |
| 2,812,765 A * | 11/1957 | Tofflemire | ............ | A61M 31/00 433/91 |
| 2,868,499 A * | 1/1959 | Kaminsky | ............. | F16K 5/0278 251/368 |
| 2,950,081 A * | 8/1960 | Steinbuch | ............. | F16K 5/0278 251/317 |
| 3,185,179 A * | 5/1965 | Harautuneian | ..... | A61M 39/223 251/181 |
| 3,224,462 A * | 12/1965 | Lopker | ................. | F16K 27/062 137/625.19 |
| 3,434,691 A * | 3/1969 | Hamilton | ................ | F16K 5/025 251/368 |
| 3,526,386 A * | 9/1970 | Gachot | ................. | F16K 27/047 251/366 |
| 3,550,902 A * | 12/1970 | Vanegas | ................ | F16K 27/067 251/151 |
| 3,595,270 A * | 7/1971 | McNeal, Jr. | .......... | F16K 11/202 251/192 |
| 3,595,523 A * | 7/1971 | Felton | ..................... | F16K 1/226 251/368 |
| 3,765,646 A * | 10/1973 | Hulslander | .......... | F16K 5/0278 251/317 |
| 3,782,686 A * | 1/1974 | Cowie | .................... | F16K 5/165 251/309 |
| 3,788,599 A * | 1/1974 | Cloyd | .................... | F16K 5/025 251/181 |
| 3,788,602 A * | 1/1974 | Kitzie | .................... | F16K 5/025 251/312 |
| 3,790,132 A * | 2/1974 | Schmitt | .................. | F16K 5/025 251/312 |
| 3,931,954 A * | 1/1976 | Guzzetta | ................ | F16K 5/166 251/109 |
| 3,938,553 A * | 2/1976 | Ortega | .................. | F16K 11/085 251/900 |
| 4,003,403 A * | 1/1977 | Nehring | .............. | F16K 11/0836 251/286 |
| 4,015,816 A * | 4/1977 | Semon | .................. | F16K 5/0478 251/192 |
| 4,031,918 A * | 6/1977 | Cagle | .................... | F16K 11/0853 251/317 |
| 4,050,472 A * | 9/1977 | Sheppard | ........... | B60H 1/00485 251/185 |
| 4,073,314 A * | 2/1978 | Speelman | ........... | F16K 11/0853 251/367 |
| 4,193,580 A * | 3/1980 | Norris | .................... | F16K 5/0407 251/304 |
| 4,257,575 A * | 3/1981 | Runyan | .................. | F16K 5/061 251/315.15 |
| 4,275,868 A * | 6/1981 | Crone | .................... | F16K 5/0414 251/317 |
| 4,286,625 A * | 9/1981 | Tomlin | ................ | F16K 11/0833 251/285 |
| 4,339,110 A * | 7/1982 | Ortega | .................. | F16K 5/0478 251/312 |
| 4,348,006 A * | 9/1982 | Schmitt | ............... | F16K 27/0218 251/366 |
| 4,364,411 A * | 12/1982 | Payton | .................. | F16K 15/026 137/513.5 |
| 4,365,366 A * | 12/1982 | Ortega | .................. | F16K 11/085 137/625.25 |
| 4,483,360 A | 11/1984 | Knappe et al. | | |
| 4,510,966 A | 4/1985 | Parsons, Jr. | | |
| 4,511,120 A * | 4/1985 | Conley | .................... | F16K 5/045 251/312 |
| 4,523,740 A * | 6/1985 | Paitchell | .............. | F16K 27/067 285/21.3 |
| 4,538,789 A * | 9/1985 | An | ........................ | F16K 5/0442 251/248 |
| 4,553,562 A * | 11/1985 | Nakada | ................. | F16K 5/0657 251/366 |
| 4,608,996 A * | 9/1986 | Brown | ................. | A61B 5/0215 604/32 |
| 4,657,222 A * | 4/1987 | Tullio | .................... | F16K 5/162 251/162 |
| 4,676,268 A * | 6/1987 | Sano | ........................ | F16K 3/22 251/266 |
| 4,697,787 A * | 10/1987 | Pelleboer | .................. | F16K 5/06 137/454.2 |
| 4,726,391 A | 2/1988 | Barra | | |
| 4,744,390 A * | 5/1988 | Henry | .................... | F16K 5/0292 294/1.3 |
| 4,794,944 A * | 1/1989 | Henry | .................... | F16K 5/0242 251/312 |
| 5,324,274 A * | 6/1994 | Martin | .................. | A61M 39/22 251/304 |
| 5,343,841 A * | 9/1994 | Hattori | ...................... | F02D 9/16 137/454.6 |
| 5,437,304 A * | 8/1995 | Delcroix | ............... | B29C 35/007 137/625.18 |
| 5,704,590 A * | 1/1998 | Pfeiffer | ................. | F16K 27/065 251/312 |
| 5,839,399 A * | 11/1998 | Luce | ........................ | F01L 7/028 137/625.21 |
| 6,176,265 B1 * | 1/2001 | Takahashi | ................ | F16K 51/02 137/625.48 |
| 6,397,884 B1 * | 6/2002 | Miyajima | .......... | F02M 25/0872 251/149.6 |
| 6,585,003 B2 | 7/2003 | Steiner et al. | | |
| 6,854,710 B2 * | 2/2005 | Gosis | .................... | F16K 5/0478 251/316 |
| 7,306,010 B2 * | 12/2007 | Gruener, Sr. | ......... | F16K 5/0647 251/315.16 |
| 9,833,128 B2 * | 12/2017 | Brommersma | ....... | F16K 27/062 |
| 10,520,099 B2 * | 12/2019 | Corso | ...................... | F16K 1/42 |
| 10,969,022 B2 * | 4/2021 | Miersch | ................. | F16K 5/165 |
| 11,644,112 B2 * | 5/2023 | Gray | ...................... | F16K 5/0264 251/309 |
| 11,913,560 B2 * | 2/2024 | Miller | ...................... | F16K 5/0207 |

(56) References Cited

U.S. PATENT DOCUMENTS

| | | |
|---|---|---|
| 2004/0094215 A1 | 5/2004 | Dragoni et al. |
| 2007/0090316 A1* | 4/2007 | Nalini .................. F16K 31/047 |
| | | 251/129.11 |
| 2011/0233437 A1* | 9/2011 | Mattson .............. F16K 11/0853 |
| | | 251/309 |
| 2019/0162320 A1 | 5/2019 | Hilgert et al. |
| 2020/0166145 A1 | 5/2020 | Kostanski et al. |

FOREIGN PATENT DOCUMENTS

| | | | | |
|---|---|---|---|---|
| DE | 102004053214 A1 | | 1/2006 | |
| DE | 102009031191 A1 | * | 12/2010 | .......... F16K 11/0716 |
| GB | 1369885 A | | 10/1974 | |
| GB | 2609634 A | * | 2/2023 | ............ A61M 16/20 |

OTHER PUBLICATIONS

Espacenet Bibliographic data: CN 209876029 (U), Published Dec. 31, 2019, 6 pgs.
Espacenet Bibliographic data: AT 404172 (B), Published Sep. 25, 1998, 12 pgs.
Espacenet Bibliographic data: DE 102004053214 (A1), Published Jan. 5, 2006, 1 pgs.

* cited by examiner

INJECTION MOLDED PLASTIC VALVE ASSEMBLY FOR A MOTOR VEHICLE

This Application claims priority in German Patent Application DE 10 2020 133 047.2 filed on Dec. 10, 2020, which is incorporated by reference herein.

The present invention relates to a valve assembly for controlling cooling fluid flows in a motor vehicle, the valve assembly comprising:
- a valve housing having a main housing body and a housing cover connected to the main housing body, a valve body receiving space being developed in the valve housing, which is enclosed by the main housing body and the housing cover,
- a fluid line system having at least two fluid lines, which run in different spatial regions starting from the valve body receiving space,
- a valve body tapering along the actuation axis, which is accommodated in the valve body receiving space rotatable about an actuation axis in such a way that by rotating the valve body about the actuation axis, a fluid connection situation of at least two fluid lines of the fluid line system is changeable, and
- a prestressing means, which applies pressure onto the valve body along the actuation axis in the tapering direction.

BACKGROUND OF THE INVENTION

Such a valve assembly for controlling fluid flows to and from a motor vehicle air-conditioning system is known from WO 2017/220350 A1. A valve assembly of a similar construction is known from EP 3 657 055 A1.

Due to the axial prestress along the actuation axis, the valve body is prestressed into the receiving valve body receiving space, thereby ensuring a sufficient tightness between the valve body and the valve housing and compensating for possible wear and/or thermal deformation on the components between the valve body and the valve housing that are movable relative to one another. Due to the complementary shape of the valve body receiving space and the valve body and due to the axial prestress of the valve body, the valve assembly advantageously does not require elastomeric sealing components between the valve body and the valve housing. Nevertheless, the known valve assemblies of the construction type mentioned at the outset have a complex design.

SUMMARY OF THE INVENTION

It is therefore an objective of the present invention to simplify the design of a valve assembly mentioned at the outset without loss of function.

The present invention achieves this objective in that both the valve body as well as at least the main housing body are formed as injection molded parts from thermoplastic. Forming the main housing body and the valve body by injection molding makes it possible to develop these components in a functionally highly integrated manner, which, as will be explained below, considerably reduces the number of components required for producing the valve assembly.

Preferably, not only is the main housing body formed as an injection molded part, but also the housing cover, although the housing cover, as a planar component, may also be cut out, in particular stamped out, of a flat semi-finished part, in particular a semi-finished plastic part.

For the subsequent description, the actuation axis defines axial directions running in parallel to it, radial directions running orthogonally to it and circumferential directions running around it.

In principle, it is conceivable to bolt the housing cover to the main housing body or generally to connect it using separate connecting means. A required tightness of the joining gap between the main housing body and the housing cover may be produced by disposing a seal in between, such as for example an O-ring around the area of the valve body opening. However, in a preferred type of construction, according to which the housing cover is fused, in particular welded, to the main housing body, both the separate connecting means as well as the sealing components situated in the joining gap of the housing cover and the main housing body may be omitted. The integral connection of housing cover and main housing body removes, as it were, a joining gap at least locally, preferably, however, in circumferentially closed fashion around the area of the valve body receptacle, so that no creepage space exists between the main housing body and the housing cover for the migration of fluid. To be sure, a maintenance of the valve assembly is made more difficult by the integral connection, in particular the fusion, particularly preferably the welding, of the main housing body and the housing cover. However, the presently proposed type of construction with the few remaining components still required for producing the valve assembly is so advantageous that for the planned service life of the valve assembly, maintenance of the same is no longer necessary.

In principle, it is conceivable to situate further components on the valve housing such as connection fittings for connecting fluid lines, which run toward and/or away from the valve body receiving space. The injection molding design option of the valve housing, however, allows for such connection formations for connecting the valve housing to fluid lines such as hoses and/or pipes to be formed in one piece on the valve housing, in particular on the main housing body. For the purpose of reducing the number of components required for forming the valve assembly it is therefore preferable if the valve housing only has the main housing body and the housing cover as housing components.

For the purpose of actuating the valve body, that is, for changing its relative rotational position relative to the valve housing about the actuation axis, an actuating shaft may protrude from the valve body along the actuation axis. This actuating shaft may penetrate through the valve housing in order to connect a rotary drive situated outside of the valve housing to the valve body. In order to reduce the number of components of the valve assembly further, the development of the valve body by injection molding offers the possibility of forming the valve body in one piece with the actuating shaft, so that an actuating shaft end protrudes in one piece from the valve body along the actuation axis. In principle, the actuating shaft or said actuating shaft end may protrude from the valve body on any side of the latter. Preferably, the actuating shaft or the actuating shaft end protrudes from the side of the valve body that has the greater cross-sectional area orthogonal to the actuation axis, that is, from the side from which the valve body tapers along the actuation axis in the tapering direction, as the cross-sectional area of its virtual enveloping surface diminishes.

Since the actuating shaft may protrude from either of the two possible sides of the valve body, and may even protrude from both sides, the actuating shaft—which also includes the actuating shaft end—may penetrate through the main housing body and/or the housing cover. To facilitate the assembly of the valve assembly, the actuating shaft preferably penetrates the housing cover, particularly preferably only the housing cover. At the location of the penetration of the valve housing, a shaft seal is provided for sealing the same, which is supported on its radially outer side on the valve housing, in particularly on the housing cover, and on its radially inner side on the actuating shaft.

In order to reduce friction between the valve body and a wall of the valve body receiving space, a shell element made of a plastic having a low coefficient of friction, such as for example polytetrafluoroethylene (PTFE), ethylene tetrafluoroethylene copolymer, polyoxymethylene, polyphtalamide, polyvinylidene fluoride, or a thermoplastic filled with friction-reducing filler, such as for example graphite or PTFE, may be disposed between the valve body and a wall of the valve housing bounding the valve body receiving space. The shell element preferably has an essentially constant shell thickness along its axial extension. The shell element preferably tapers both on its radially outer side as well as on its radially inner side along the actuation axis, so that the axial prestress load of the valve body results not only in the outer side of the valve body being pressed against the shell element, but also in the outer side of the shell element to be pressed against the wall of the valve body receiving space of the valve housing. The axial prestress load of the valve body thus results not only in an equilibrium of wear during the operational life of the valve assembly, but also in a sealing of gaps between the components involved against fluid migrating through the gaps.

The wall bounding the valve body receiving space radially is preferably designed to be complementary to a virtual rotationally symmetric enveloping surface of the valve body enclosing the valve body in the radial direction, so that the wall of the valve body receiving space also tapers in the axial direction along the actuation axis. With respect to the actuation axis, the enveloping surface is a rotationally symmetric or at least partially rotationally symmetric enveloping surface over the adjustment range of the valve body, which extends across recessed flow-through volumes on the outside of the valve body and/or across flow-through openings of channels penetrating the valve body, formed on the outside of the valve body, as if these did not exist and the valve body were a solid formation.

The valve body may taper along an arbitrarily curved virtual enveloping surface. The virtual enveloping surface is preferably conical, and the valve body is thus preferably frustoconical. In this example, the tapering direction is coaxial with the cone axis and points from the end face having the greater diameter to the end face having the smaller diameter.

Disposing a separate friction-reducing shell element may be avoided if the valve body abuts directly against a wall of the valve housing bounding the valve body receiving space. For this purpose, the valve body may be formed from a plastic having a low coefficient of friction, such as for example polytetrafluoroethylene (PTFE), ethylene tetrafluoroethylene copolymer, polyoxymethylene, polyphtalamide, polyvinylidene fluoride, or a thermoplastic filled with friction-reducing filler, such as for example graphite or PTFE.

A "plastic having a low coefficient of friction" is any plastic that has a lower coefficient of friction than conventional polyethylene when paired with the plastic of the wall of the valve body receiving space.

In order to be able to fulfill its function and to be able to produce different flow situations as a function of its rotational position, the valve body has at least one volume through which fluid is able to flow in the operation of the valve assembly. The flow-through volume may be developed entirely on an exterior section of the valve body, for example in the way of a recess developed from the exterior of the valve body radially inward toward the actuation axis. In this case, a section of the wall of the valve body receiving space situated in the circumferential area of the flow-through recess forms a radially outer bounding wall for the fluid flow flowing through the valve body in operation. Alternatively, the flow-through volume may be formed partially or entirely by a channel penetrating through the valve body, of which only the openings are located on the outer side of the valve body. In this case, the valve body alone delimits the fluid flow penetrating the valve body in the operation of the valve assembly.

In order to facilitate the production of the valve body while simultaneously increasing the quality of the resulting valve assembly, the valve body may have on its outer side at least one rib protruding away from the actuation axis and running on the outer side of the valve body, which surrounds the flow-through volume or an opening of the flow-through volume through which fluid is able to flow in the outer surface of the valve body. Said rib preferably protrudes in one piece from the valve body on the outer side of the latter. It is readily possible to produce such a rib by injection molding.

In this case, the seating of the rib either on the opposite shell element or on the opposite wall of the valve body receiving space ensures a very good sealing of the valve body with respect to the component in which it is seated. Since only the comparatively narrow rib of the valve body rests on the opposite component, a higher contact pressure is achieved, in case of an identical axial load and otherwise identical component geometry between the rib and the opposite component, than if the valve body would rest in a planar manner with its entire outer side against the opposite component. The increased contact pressure in turn yields a greater tightness in the area of the physical seating of the rib on the opposite component. Furthermore, fluid forces acting on both sides on a narrow rib that extends also or only axially in the circumferential direction are able to cancel each other out, which is not always the case in a planar abutment of the valve body against its opposite component.

Moreover, when developing the mentioned at least one rib, it suffices to develop only the at least one rib with high precision, while the remaining valve body lying radially offset toward the actuation axis with respect to the radially outer rib surface may be produced with high tolerances since the at least one rib alone ensures the required sealing of different flow regions of the valve body on the valve body receiving space.

Such a seating and sealing rib is preferably no wider than 4 mm, preferably no wider than 2 mm, orthogonally both with respect to its course as well as with respect to its protrusion direction. Furthermore, in order to improve the sealing effect, it is possible to develop at least in sections, preferably completely, two or more parallel ribs, which are separated by a groove running in between.

In principle, it may suffice if the valve body comprises only one flow-through volume. If the latter is developed as a channel, it is possible for the valve body to have only two openings, one for the entry of fluid and one for the outlet of fluid. In this case, the valve assembly may be used as a blocking valve and/or mixing valve. For a greater functional scope for connecting and/or separating different input and output lines into the valve assembly and out of the valve assembly, the valve body may have a plurality of flow-through volumes and/or a plurality of flow-through openings in its outer surface. To avoid short-circuit flows between these, each flow-through volume and/or each flow-through opening is preferably surrounded by at least one rib protruding on an outer side of the valve body and running along an outer side of the valve body.

The prestressing means is preferably provided in the valve assembly in such a way that it is supported with a first support section on the valve housing side, preferably on the valve housing itself, and with a second support section, differing from the first support section, on the valve body side, for example on the valve body itself. Preferably, it is supported with the first support section on the housing cover. A bearing component may be situated between the first support section and the housing cover as a counter bearing of the prestressing means. The first support section, however, is preferably supported directly on the housing cover. A counter bearing formation on the valve housing, in particular on the housing cover, which fixates the first support section in the radial direction, is preferably developed in one piece with the valve housing, in particular with the housing cover.

In the related art, a roller bearing is often provided between the second support section and the valve body, in order to reduce the actuating forces, which are required for rotating the valve body relative to the valve housing. In principle, such a roller bearing may be provided in the presently discussed valve assembly, which however increases the expenditure in the fabrication and assembly of the valve assembly as well as increasing its weight. Fundamentally, it suffices for a sliding bushing to be situated between the second support section and the valve body, which is in a sliding contact engagement with the second support section and/or with the valve body. The sliding bushing may be developed having a comparatively small contact surface, so that its friction effect does not unduly increase the aforementioned actuating forces of the valve body. A suitable choice of material may further reduce the friction on the sliding bushing. To avoid an undesired torsion of the preferably only axially pressing prestressing means, the sliding bushing is preferably non-rotatable relative to the prestressing means and rotatable relative to the valve body. The sliding bushing is preferably also an injection molded part.

In order to avoid undesired effects of a settling of the prestressing means and consequently a gradual loss of prestressing force, the prestressing means is preferably formed from metal. Particularly preferably, the prestressing means is formed from stainless steel in order to avoid or as much as possible reduce corrosion due to contact with the fluid flowing through the valve assembly. Particularly preferably, the prestressing means is the only component of the valve assembly that is made of metal. The prestressing means is preferably a compression spring.

In general, it may suffice if the flow lines running through the valve housing and the valve body are situated in a common plane. A higher flow rate of fluid volume per unit of time through the valve assembly is possible, however, if the valve assembly has two or more parallel planes in which flow lines run through the valve assembly. Flow lines situated in different planes may be controlled by a single valve body if the latter has flow-through volumes and/or flow-through openings also in different planes. The longer the required axial design of a valve body, however, the sooner problems will arise of sealing the latter with respect to the wall of the valve body receiving space. Excellent sealing in spite of flow lines in multiple mutually parallel planes may be achieved in that the valve assembly has two valve bodies that are coaxial relative to the actuation axis, axially movable relative to each other and respectively axially loaded. Preferably, these two valve bodies are loaded by a single common prestressing means axially away from each other. To simplify the fabrication and assembly, the two valve bodies are preferably developed to be identical, it possibly being sufficient if an actuating shaft protrudes only from one valve body.

Preferably, a single actuating drive then suffices for operating the valve assembly, if the two valve bodies are connected to each other for joint rotation. To facilitate the use of identical parts, the two valve bodies may have on the side respectively facing the other valve body along the actuation axis a rotationally non-symmetric recess. A connecting part may then engage in a form-locking manner into the two coaxial rotationally non-symmetric recesses, which connects the two valve bodies for joint rotation about the actuation axis.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
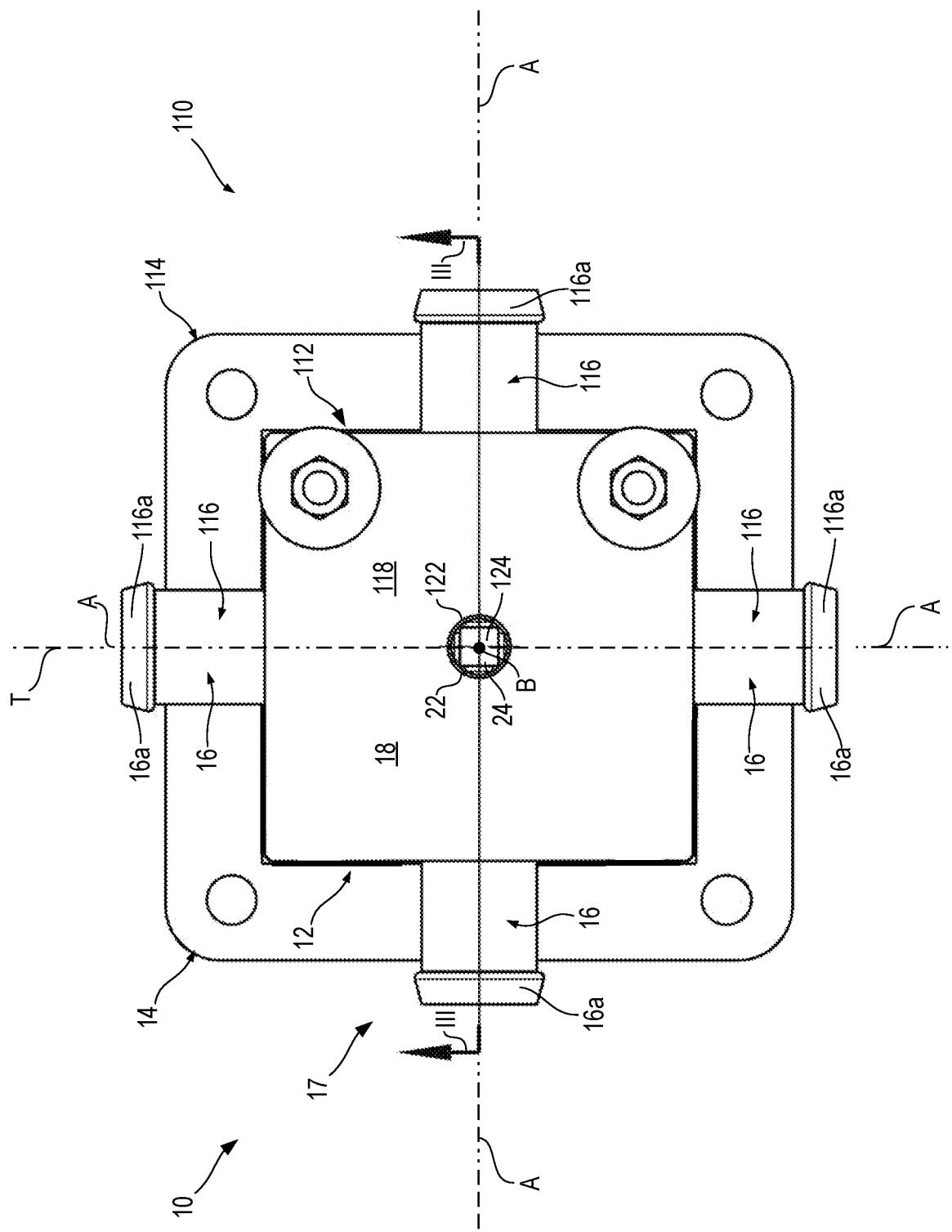
FIG. 1 a schematic top view in the viewing direction along the actuation axis onto a first exemplary embodiment of a valve assembly according to the invention in the left half of the drawing and onto a second exemplary embodiment of a valve assembly according to the invention in the right half of the drawing, FIG. 2 a schematic elevation view of the two valve assemblies of FIG. 1, FIG. 3 a schematic sectional view of the two specific embodiments of FIGS. 1 and 2 along the sectional plane III-III of FIG. 1, FIG. 4 a schematic perspective view of a first specific embodiment of a valve body for use in one of the valve assemblies of FIGS. 1 through 3, FIG. 5 a schematic perspective view of a second specific embodiment of a valve body for use in one of the valve assemblies of FIGS. 1 through 3, FIG. 6 a schematic elevation view of a first valve body configuration having two identical valve bodies, and FIG. 7 a schematic elevation view of a second valve body configuration having two identical valve bodies.
Figure 2:
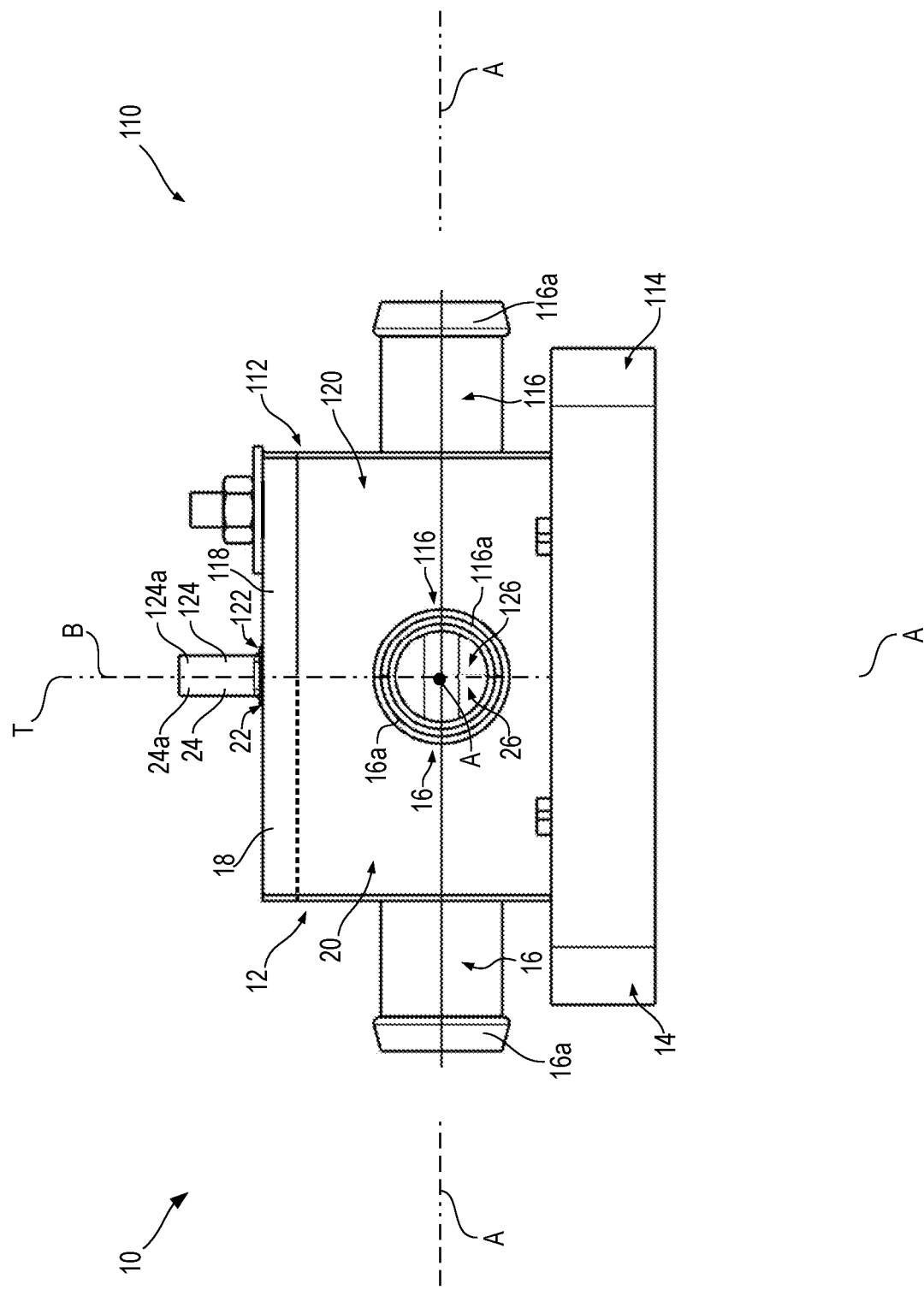
Figure 3:
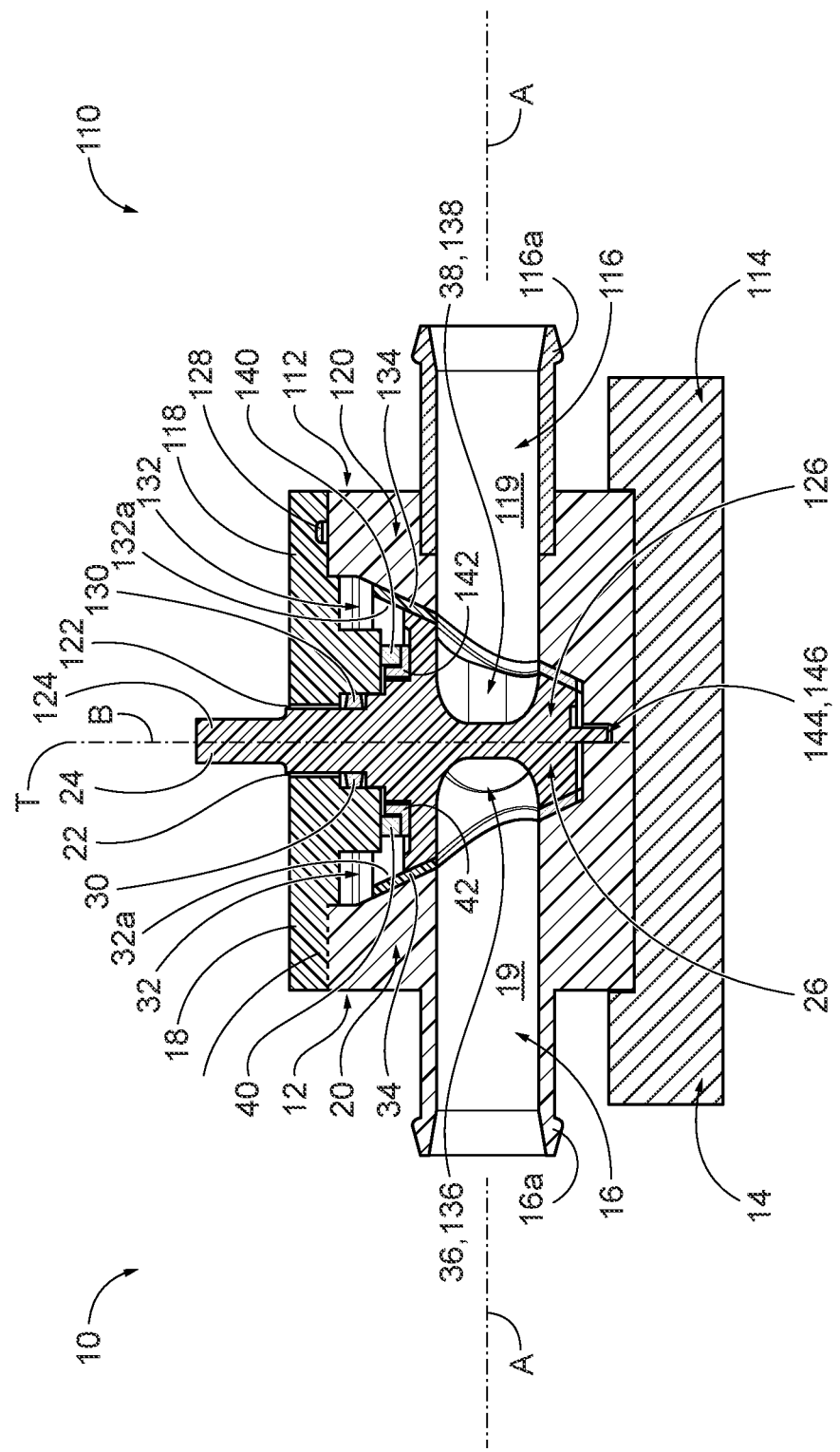

Referring now to the drawings wherein the showings are for the purpose of illustrating preferred and alternative embodiments of the invention only and not for the purpose of limiting the same, FIGS. 1 through 3 respectively show in the left half of the drawing a first specific embodiment of a valve assembly 10 and in the right half of the drawing a second specific embodiment of a valve assembly 110.

Components and component sections identical and functionally identical to those in the first specific embodiment are labeled in the second specific embodiment with the same reference numerals, but incremented by the number 100. The second specific embodiment will be described only to the extent that it differs from the first specific embodiment, express reference otherwise being made to the explanation of the first specific embodiment for the description of the second specific embodiment. The separation of the two specific embodiments occurs along a separation plane T that is respectively orthogonal to the drawing planes of FIGS. 1 through 3.

Valve assembly 10 comprises a valve housing 12, which is mounted in a base 14 in the illustrated exemplary embodiment. Base 14 is not necessary, however.

Four connection formations 16 protrude from valve housing 12 along connection axes A in the exemplary form of respectively one connection fitting for connecting a fluid line such as a hose or a pipe, for example. In a manner known per se, connection formations 16 respectively have at their free longitudinal end a projecting rim running around connection axis A preferably in a closed manner as a safety catch of a fluid line situated on the respective connection formation 16. Connection formations 16 are part of a fluid line system 17, which also includes the fluid lines 19 (see FIG. 3) developed in valve housing 12.

The viewer of FIG. 1 looks onto housing cover 18, which completely conceals the main housing body 20 (see FIGS. 2 and 3) situated behind housing cover 18 in the viewing direction of FIG. 1.

A central opening 22 passes through housing cover 18, through which an actuating shaft end 24 of a valve body 26 (see FIGS. 2 and 3) extends along the actuation axis B, which is orthogonal to the drawing plane of FIG. 1. Actuating shaft end 24 is thus accessible from outside valve housing 12 for introducing a torque using a drive that is now shown.

FIG. 2 shows an elevation view of the two specific embodiments of valve assemblies 10 and 110, respectively, from FIG. 1. The direction of view of FIG. 2 runs along the lowermost connection axis in FIG. 1, orthogonally to actuation axis B, which runs parallel to the drawing plane of FIG. 2.

As may be seen in FIG. 2, the two specific embodiments differ, among other things, in that housing cover 18 is fused with main housing body 20, that is, preferably fused by welding. For the preferred integral connection of housing cover 18 and main housing body 20, various welding methods are conceivable such as, for example, hot plate welding, infrared welding, hot air welding, ultrasonic welding and the like. Housing cover 18 may also be integrally connected to main housing body 20 in a chemical manner, for example in that the mutually facing surfaces of housing cover 18 and main housing body 20 are partially dissolved by application of a solvent and are connected to each other in the partially dissolved state. Adhesive bonding of housing cover 18 to main housing body 20 is in principle also conceivable, although thermal fusion of housing cover 18 and main housing body 20 is preferable. Fusing housing cover 18 and main housing body 20 results in an absolutely tight joint between housing cover 18 and main housing body 20, without having to provide a separate sealing configuration between the two components.

The housing cover 118 of the second specific embodiment of valve assembly 110, on the other hand, is screw fitted to main housing body 120. As may be seen in the sectional view of FIG. 3, this requires, however, the development of a sealing groove 128 in one of the two components of housing cover 18 and main housing body 20, in the illustrated example in housing cover 18. Furthermore, in order to seal the joining gap between housing cover 18 and main housing body 20, which exists even after the screw fitting, a sealing device is required, which is to be situated in sealing groove 128.

For better clarity, the screw connection between housing cover 118 and main housing body 120 behind the sectional plane is not shown in FIG. 3.

As is further shown in the sectional view of FIG. 3, whose sectional plane III-III includes both actuation axis B as well as both connection axes A right and left in FIG. 1, the connection formations 116 of the second specific embodiment are developed as separate components and mounted in corresponding mounting recesses, for example adhesively bonded and/or shrunk into these mounting recesses.

The connection formation 16 of the first specific embodiment by contrast is formed in one piece on the main housing body 20 produced by injection molding. The main housing body 120 of the second specific embodiment is also produced by injection molding.

As may be seen further in FIG. 3, actuating shaft end 24 is formed in one piece with the roughly schematic frustoconical valve body 26 and protrudes axially from the larger end face of the roughly schematic frustoconical valve body 26. At its free longitudinal end, actuating shaft end 24 has a rotationally non-symmetric, in this case: polyhedral, coupling formation 24a for the torque-transmitting coupling to a drive that is not shown in the figures.

Actuating shaft end 24 is outwardly sealed with respect to the opening 22 in housing cover 18 penetrated by actuating shaft end 24 by a shaft seal 30 situated in housing cover 18.

Valve body 26 is accommodated in a valve body receiving space 32 in main housing body 20. A shell element 34 made of a friction-reducing plastic material is disposed between valve body 26 and a wall 32a bounding the valve body receiving space 32 radially outwardly. The friction-reducing plastic material may be selected, among other things, from polytetrafluoroethylene (PTFE), ethylene tetrafluoroethylene copolymer, polyoxymethylene, polyphtalamide, polyvinylidene fluoride, or a thermoplastic filled with friction-reducing filler, such as for example graphite or PTFE.

Alternatively, shell element 34 may be omitted and valve body 26 itself may be formed from the friction-reducing plastic material and contact wall 32a directly. As a further option, the valve body may have a core made of a conventional plastic, which is overmolded radially on the outside with a friction-reducing plastic or onto which a friction-reducing plastic is injection molded radially on the outside. In mating with the material of wall 32a, the friction-reducing plastic has a lower coefficient of friction than the material of the core of the valve body.

In the illustrated example, valve body 26 has two flow-through volumes 36 and 38, which are recessed from its frustoconical virtual enveloping surface (see the virtual enveloping surface H' in FIG. 7) toward actuation axis B into valve body 26. Flow-through volumes 36 and 38 are physically separated from each other by valve body 26. In the example of FIG. 3, valve body 26 is situated in a rotational position, in which in FIG. 1 it connects the right and the lower connection formations 16 to each other via flow-through volume 38 to form a continuous fluid line and separates these from the left and the upper connection formations 16, which for their part are connected to each other by flow-through volume 36 to form a continuous fluid line.

On the inner side of housing cover 18, a prestressing means 40 is supported in the exemplary form of a compression spring. On its end opposite from housing cover 18, prestressing means 40 is supported on a sliding bushing 42, which is connected to prestressing means 40 in a torsionally fixed manner with respect to a rotation about actuation axis B, but which is able to slide relative to valve body 26. Sliding bushing 42 is merely in an abutting engagement with valve body 26.

Valve cover 26 and with it, if present, shell element 34 is subjected to pressure by prestressing means 40 in the direction of its tapering, that is, in the direction from its larger diameter end toward its smaller diameter end, thereby ensuring contact of the stressed components to one another. This makes it possible to compensate for wear, thermal deformation and the like. In addition, the tightness in the area of valve body receiving space 32 is thereby increased, since the joining gaps between valve cover 26 and shell element 34 or wall 32a as well as between shell element 34 and wall 32a are reduced and can only be increased against the pressure applied by prestressing means 40.

The shell element 34, which is torsionally fixed relative to main housing body 20 by form-locking engagement, has passages in the area of fluid lines 19 penetrating connecting formations 16, in order to connect these fluid lines 19 to valve body receiving space 32 and thereby, depending on the rotational position of valve body 26, to flow-through volumes 36 and 38.

Shell element 34 is inserted axially along actuation axis B into valve body receiving space 32 of main housing body 20. On a circumferential section, shell element 34 has a projection radially on the outside (not shown), which is insertable into an axial groove in main housing body 20 along actuation axis B, so that the shell element may be mounted in the axial direction and is fixated in the fully mounted state by the axial groove in the circumferential direction about actuation axis B.

As is shown in the right half of the drawing in FIG. 3, on its side opposite from the projection side of actuating shaft end 24, valve body 26 may have a centering protrusion 144, which projects into a corresponding centering recess 146 of main housing body 20. As is shown on the left half of the drawing of FIG. 3, such centering by way of centering protrusion 144 and centering recess 146 is not essential due to the frustoconical shape of valve body 26.

Figure 4:
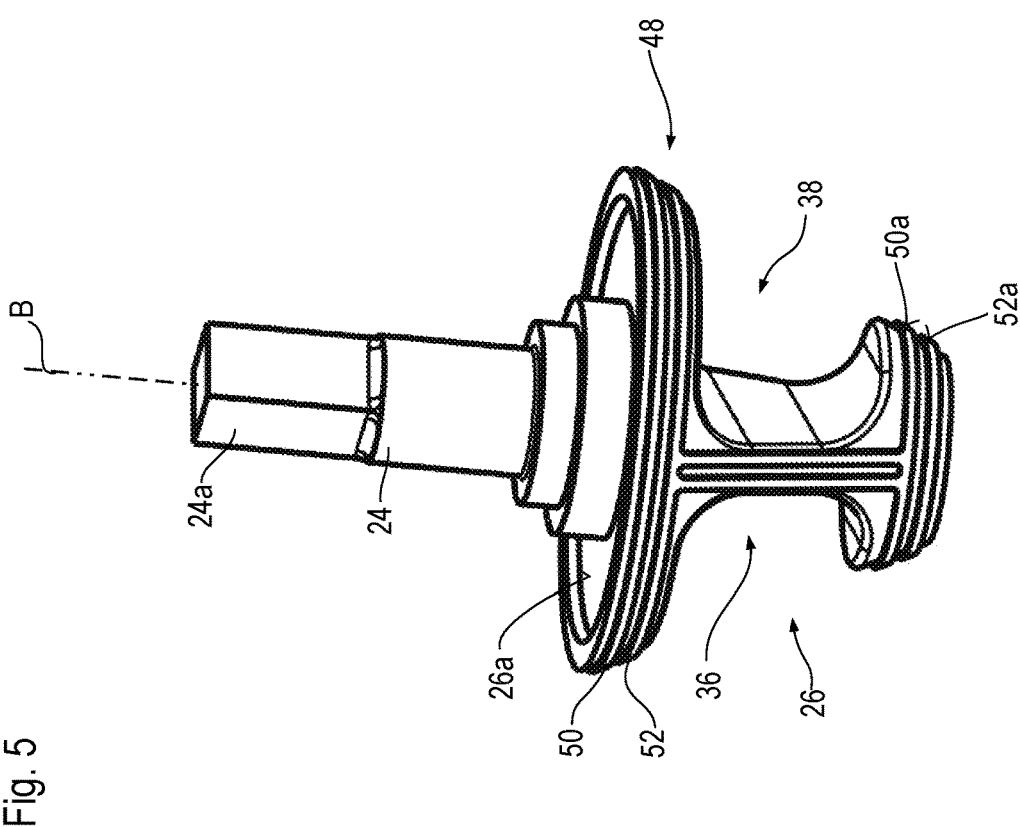

In a perspective view, FIG. 4 shows schematically valve body 26 in isolation, which is formed in one piece with actuating shaft end 24. The end face of valve body 26, on which sliding bushing 42 abuts in a sliding manner, is indicated by 26a.

A continuous rib structure 48 surrounds each flow-through volume 36 and 38 on the radial outer side of valve body 26. Rib structure 48 is thus a fluid-mechanical separating structure between the flow-through volumes 36 and 38.

Rib structure 48 comprises a single rib 50 projecting radially outward, whose radially outwardly facing free end face 50a, in the completely mounted and operational state, sealingly abuts either on the inner side of shell element 34 or on wall 32a of valve body receiving space 32. At a predefined axial prestress force exerted by prestressing means 40, the end face 50a abuts against the radially opposite component with higher contact pressure than valve body 26 without a rib, due to the considerably smaller area of end face 50a of rib 50 in comparison to the remaining frustoconical lateral surface of valve body 26.

Since only the end face 50a of rib 50 must sealingly abut against a radially opposite component, only end face 50a must be produced with high precision by injection molding, while the remaining surfaces of valve body 26 may be injection molded with higher tolerance. Hydrodynamic and hydrostatic forces, which act on the edges of rib 50 on both sides of end face 50a in the circumferential direction, mutually cancel each other out in terms of actual value.

Figure 5:
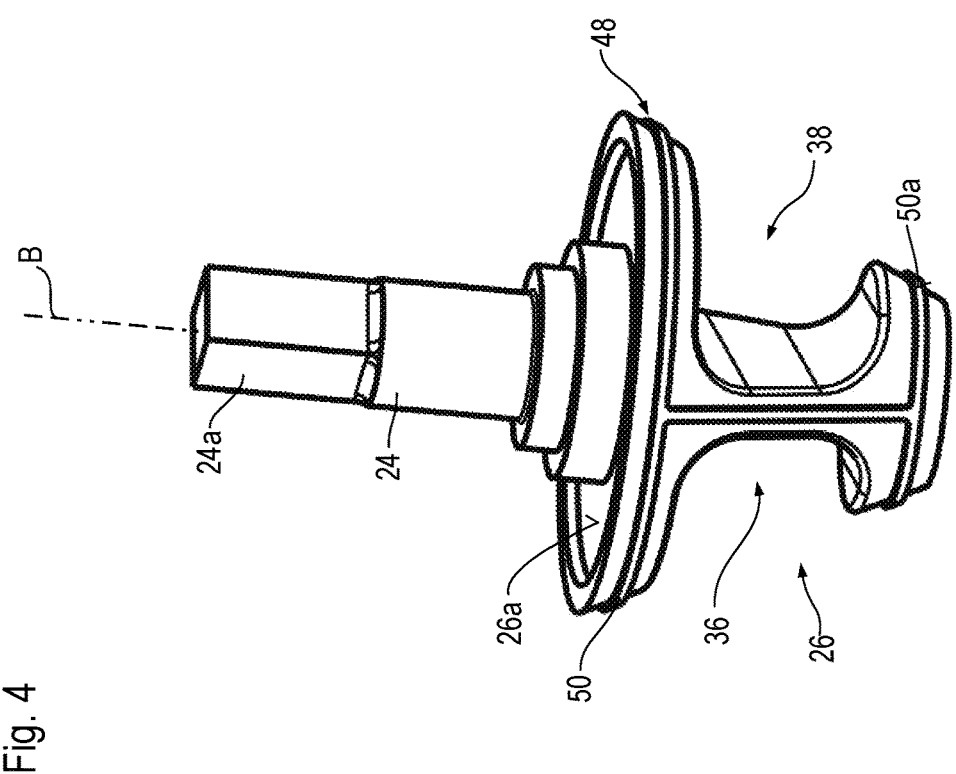

FIG. 5 shows a variation of valve body 26 from FIG. 4. Valve body 26 from FIG. 4 corresponds completely to the one of FIG. 5 with the exception that rib structure 48 has two mutually parallel ribs 50 and 52 instead of just one rib. Accordingly, two end faces 50a and 52a, which lie in a common frustoconical virtual enveloping surface, are developed for making contact with a radially opposite component.

Figure 6:
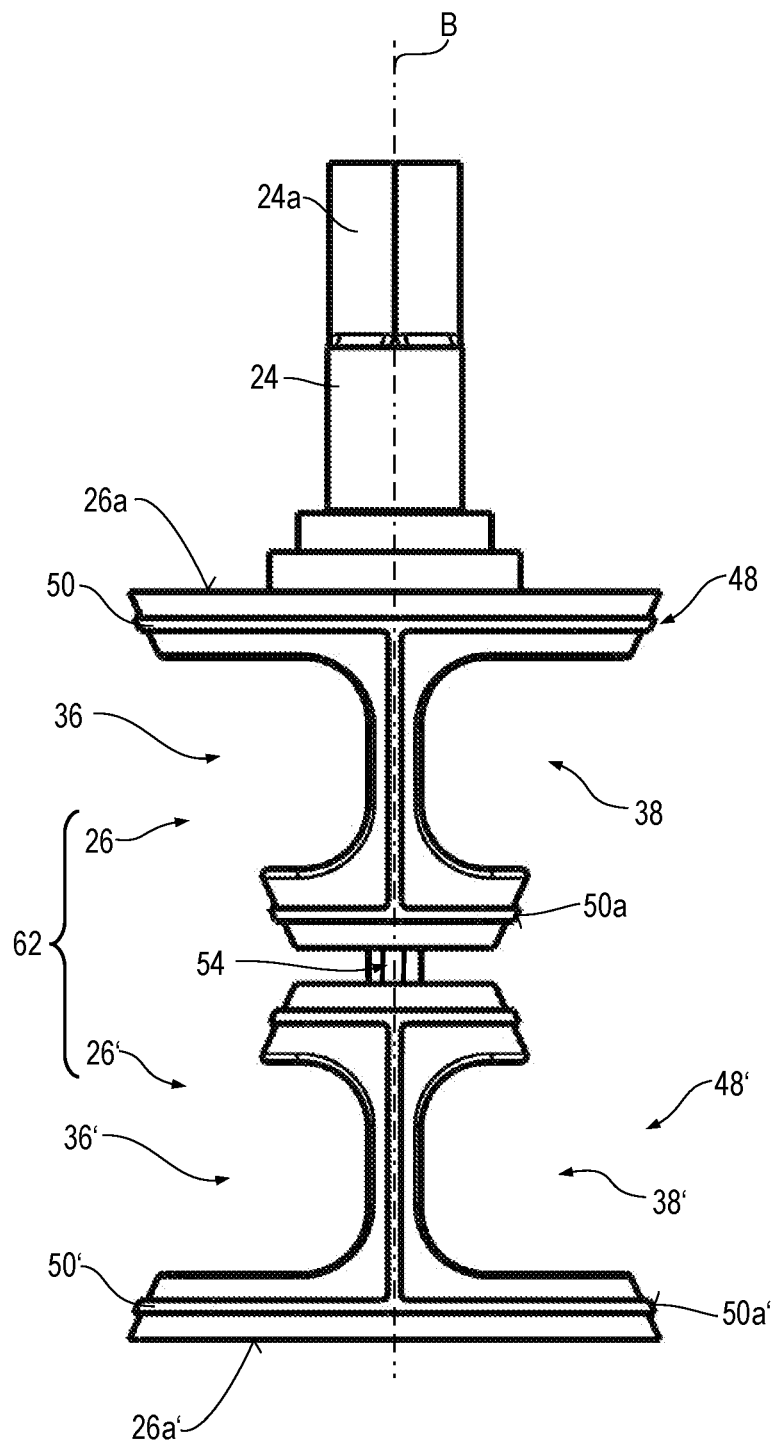

FIG. 6 shows a variation of the valve body of a valve assembly according to the present invention. A valve body 26, as it is known from FIG. 4, is coupled to an identical valve body 26', which is merely rotated by 180° with respect to an axis orthogonal with respect to actuation axis B. Identical and functionally identical components and component sections on valve body 26' are labeled by the same reference numerals as on valve body 26, but with the addition of an apostrophe.

Valve body 26 is developed in mirror symmetry with respect to two mutually orthogonal mirror symmetry planes that intersect each other in actuation axis B. In FIG. 6, one of the mirror symmetry planes is orthogonal with respect to the drawing plane of FIG. 6 and coincides with the representation of actuation axis B. The other mirror symmetry plane is parallel to the drawing plane of FIG. 6.

Valve bodies 26 and 26' form a valve body configuration 62, whose valve bodies 26 and 26', arranged coaxially with respect to actuation axis B, are coupled by a rotationally non-symmetric prism rod 54 for joint rotation about actuation axis B. Prism rod 54, however, allows for an axial relative movement of valve bodies 26 and 26', so that the latter may be prestressed from their respective larger diameter end faces 26a and 26a' toward each other.

Using only one drive, valve body configuration 62 allows for a greater, essentially a two-fold, quantity of fluid per unit of time to flow through the valve assembly in the otherwise identical operating position of the valve assembly, compared to a valve assembly that has only one valve body.

Figure 7:
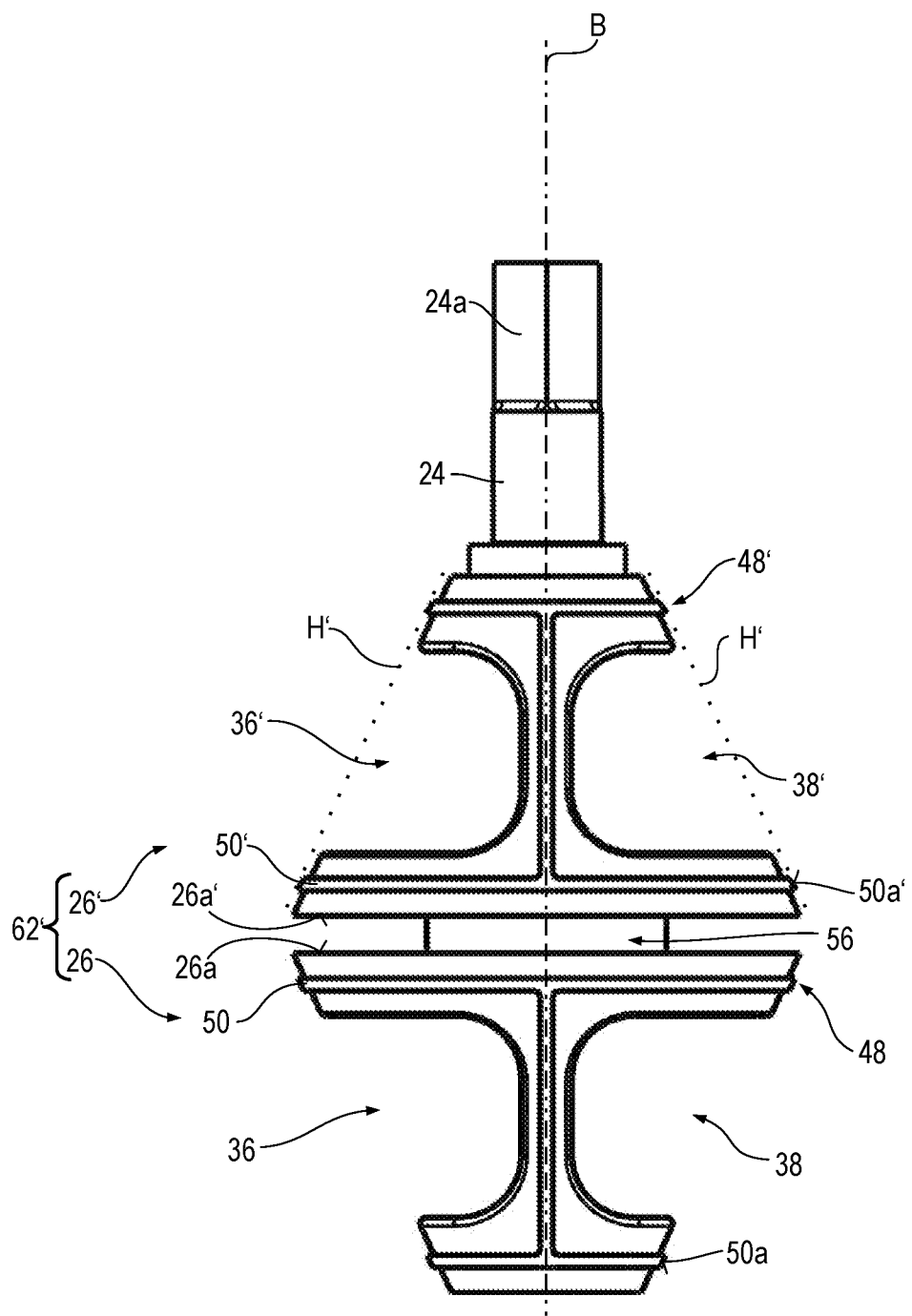

FIG. 7 shows a further variation of the valve body configuration as valve body configuration 62'. Valve body configuration 62' corresponds to valve body configuration 62 from FIG. 6, with the exception that valve bodies 26 and 26' face each other not with their smaller diameter end faces, but with their larger diameter end faces 26a. Accordingly, actuating shaft end 24 does not protrude from the larger diameter end face of a valve body 26 or 26', but from its smaller diameter end face.

This specific embodiment has the advantage that a single prestressing means 56 situated axially between the two valve bodies 26 and 26' suffices to apply pressure onto each valve body 26 and 26' axially away from the respectively other valve body 26 or 26' in its respective tapering direction.

The valve housing accommodating valve body configurations 62 and 62' from FIG. 6 and FIG. 7, respectively, will normally comprise more than only two housing components in order to allow for a simple assembly of a valve assembly having a valve body configuration 62 or 62'. For example, such a valve assembly may have a main housing body and the latter may have one housing cover on each of two axially opposite sides.

The valve assembly presented here may be used advantageously in an electrically driven vehicle in order to conduct cooling liquid to thermally stressed units. The preferred fluid is a liquid, although gas shall not be excluded. In operation, the valve assembly particularly preferably has a water-glycol mixture flowing through it.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A valve assembly for controlling cooling fluid flows in a motor vehicle, the valve assembly comprising:
   a valve housing having a main housing body and a housing cover permanently connected to the main housing body, a valve body receiving space being developed in the valve housing, which is enclosed by the main housing body and the housing cover,
   a fluid line system having at least two fluid lines, which run in different spatial regions starting from the valve body receiving space,
   a valve body tapering along an actuation axis, which is accommodated in the valve body receiving space rotatable about the actuation axis in such a way that by rotating the valve body about the actuation axis, a fluid connection situation of at least two fluid lines of the fluid line system is changeable, and
   a prestressing means, which applies a pressure onto the valve body along the actuation axis in a tapering direction, wherein the prestressing means is a compression spring,
   wherein both the valve body as well as at least the main housing body are formed as injection molded parts from thermoplastic,
wherein the valve body has a plurality of flow-through volumes and/or a plurality of flow-through openings in its outer surface, each flow-through volume and/or each flow-through opening being surrounded by at least one fluid sealing rib protruding in one piece from an outer side of the valve body and running along the outer side of the valve body and at least partially transverse to the actuation axis, wherein the prestressing means is made of metal and the prestressing means is the only metallic component in the valve housing.

2. The valve assembly as recited in claim 1, wherein the prestressing means is supported on a valve housing side with a first support section and on a valve body side with a second support section that is different from the first support section.

3. The valve assembly as recited in claim 2, wherein a sliding bushing is situated between the second support section and the valve body, which is in a sliding contact engagement with the second support section and/or with the valve body.

4. The valve assembly as recited in claim 1, wherein the prestressing means is made of a stainless steel.

5. The valve assembly as recited in claim 1, wherein the valve assembly has two valve bodies that are coaxial with respect to the actuation axis, are axially movable relative to each other, and are respectively axially loaded.

6. The valve assembly as recited in claim 5, wherein the two valve bodies are connected to each other for joint rotation.

7. The valve assembly as recited in claim 1, wherein the housing cover is fused to the main housing body.

8. The valve assembly as recited in claim 1, wherein the housing cover is welded to the main housing body.

9. The valve assembly as recited in claim 1, wherein the valve housing comprises only the main housing body and the housing cover as housing components.

10. The valve assembly as recited in claim 1, wherein at least two connection formations are formed on the outer side of the valve housing for connecting a fluid line to the at least two connections.

11. The valve assembly as recited in claim 1, wherein an actuating shaft protrudes from the valve body along the actuation axis, which penetrates through the valve housing.

12. The valve assembly as recited in claim 1, wherein between the valve body and a wall bounding the valve body receiving space, a shell element made of a plastic having a low coefficient of friction is disposed.

13. The valve assembly as recited in claim 12, wherein the plastic that has a low coefficient of friction is taken from the group consisting of polytetrafluoroethylene, ethylene tetrafluoroethylene copolymer, polyoxymethylene, polyphtalamide, polyvinylidene fluoride, a thermoplastic filled with a friction-reducing filler, a thermoplastic filled with friction-reducing graphite and a thermoplastic filled with friction-reducing PTFE.

14. The valve assembly as recited in claim 1, wherein the valve body abuts directly on a wall bounding the valve body receiving space, the valve body being formed from a plastic having a low coefficient of friction.

15. The valve assembly as recited in claim 14, wherein the plastic that has a low coefficient of friction is taken from the group consisting of polytetrafluoroethylene, ethylene tetrafluoroethylene copolymer, polyoxymethylene, polyphtalamide, polyvinylidene fluoride, a thermoplastic filled with a friction-reducing filler, a thermoplastic filled with friction-reducing graphite and a thermoplastic filled with friction-reducing PTFE.

* * * * *